(12) United States Patent
Fox-Rabinovitz et al.

(10) Patent No.: US 12,728,885 B2
(45) Date of Patent: Sep. 8, 2026

(54) AUTOMATED MANAGEMENT OF A FIFTH-WHEEL HITCH FOR AN AUTONOMOUS VEHICLE

(71) Applicant: TORC Robotics, Inc., Blacksburg, VA (US)

(72) Inventors: Joseph Fox-Rabinovitz, Austin, TX (US); Nicholas Atanasov, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 136 days.

(21) Appl. No.: 18/235,330

(22) Filed: Aug. 17, 2023

(65) Prior Publication Data

US 2025/0058794 A1 Feb. 20, 2025

(51) Int. Cl.
*B60D 1/42* (2006.01)
*B60D 1/58* (2006.01)
*B60W 60/00* (2020.01)

(52) U.S. Cl.
CPC ............. *B60W 60/001* (2020.02); *B60D 1/42* (2013.01); *B60D 1/58* (2013.01)

(58) Field of Classification Search
None
See application file for complete search history.

(56) References Cited

U.S. PATENT DOCUMENTS 7,806,423 B2 * 10/2010 Vikstrom ........... B62D 53/0814 280/441
11,643,154 B2 * 5/2023 Grossman .......... B62D 53/0842 701/23
11,803,188 B1 10/2023 Gupta et al.
2006/0186636 A1 8/2006 Schutt et al.
(Continued)

FOREIGN PATENT DOCUMENTS

CN 112672947 A 4/2021
WO 2006048718 A1 5/2006

OTHER PUBLICATIONS

"2015 Freightliner Cascadia 125 Fifth Wheels", Retrieved from Internet: https://www.truckcs.com/parts/fsfn3201-8-2015-freightliner-cascadia-125-fifth-wheels.

(Continued)

*Primary Examiner* — James M Mcpherson
(74) *Attorney, Agent, or Firm* — Armstrong Teasdale LLP

(57) ABSTRACT

Aspects of this technical solution can include generating, by a processor, a first metric corresponding to a first signal from one or more first sensors, the first sensor configured to detect a position of a fifth-wheel hitch of a vehicle with the fifth-wheel hitch in a first position, generating, by the processor, a second metric corresponding to a second signal from a drive assembly, the drive assembly configured to reposition of the fifth-wheel hitch, generating, by the processor and based on the first and second metrics, a third metric, the third metric corresponding to a second position of the fifth-wheel hitch with a predetermined load balancing (Continued)

configuration and transmitting, by the processor and responsive to a determination that the second position of the fifth-wheel hitch corresponds to a predetermined load balancing configuration of the vehicle, the third metric to the drive assembly.

20 Claims, 6 Drawing Sheets

(56) References Cited

U.S. PATENT DOCUMENTS

2008/0029995 A1* 2/2008 Alguera ............ B62D 53/0807 280/407.1
2009/0184490 A1* 7/2009 Alguera .................. B60D 1/62 280/420
2010/0262338 A1* 10/2010 Alguera ............ B62D 53/0814 701/36
2010/0262341 A1* 10/2010 Alguera ............ B62D 53/0814 701/49
2013/0297154 A1* 11/2013 Burchett ........... B62D 53/0814 280/438.1
2015/0102583 A1 4/2015 Reimer
2015/0158355 A1* 6/2015 Alldredge ............. B62D 53/08 280/434
2016/0018229 A1 1/2016 Lee
2017/0144714 A1* 5/2017 Dupay ............... B62D 53/0814
2017/0174019 A1* 6/2017 Lurie ..................... B60D 1/015
2017/0174275 A1 6/2017 Mohamad Jembari et al.
2019/0367107 A1* 12/2019 Grossman ............ B62D 53/125
2020/0273133 A1 8/2020 Morris
2021/0294337 A1* 9/2021 Van Mill .............. G05D 1/0246
2022/0121691 A1 4/2022 Barathi
2022/0177033 A1 6/2022 Laine et al.
2022/0324525 A1 10/2022 Vikström et al.
2024/0116318 A1* 4/2024 Gaufin .................... B60D 1/58

OTHER PUBLICATIONS

"Fontaine Fifth Wheel No-SlackTM Rebuild", Fontaine Fifthwheel, published Jan. 9, 2013, Retrieved from Internet: https://www.youtube.comiwatch?v=sjRZDvj9Zgk.
"JSK37USK Sensor Technology" flyer, JOST International.
"YF2A14-050UB3XLEAX", Retrieved from Internet: https://www.sick.comiusienicatalogiaccessories/plug-connectors-and-cables/yf2a14-050ub3xleax/p/p559252.
"JOST JSK37USK Series Air-Release Fifth Wheel with Sensor Technology", JOST International, published Jan. 17, 2017, Retrieved from Internet: https://www.oemoffhighway.com/drivetrains/product/20849230/jost-international-jost-jsk37usk-series-airrelease-fifth-wheel-with-sensor-technology.
"Jost International introduces fifth wheel with sensor coupling system", Fleet Equipment Staff, published Jan. 19, 2017, Retrieved from Internet: https://vvvvw.fleetequipmentmag.com/jost-international-fifth-wheel-sensor-coupling-systems/.
"IMA30-20BE1ZCOK", Retrieved from Internet: https://www.sick.comiusienicatalog/productsidetection-sensors/inductive-proximity-sensorsiimaiima30-20be1zc0k/p/p233050.
"How to Couple and Uncouple the JOST 5th Wheel", JOSTInternational, published Mar. 12, 2012, Retrieved from Internet: https://vvwww.youtube.comiwatch?v=atKelxzvoHA.

* cited by examiner

AUTOMATED MANAGEMENT OF A FIFTH-WHEEL HITCH FOR AN AUTONOMOUS VEHICLE

TECHNICAL FIELD

The present disclosure relates generally to autonomous vehicles and, more specifically, to automatically sensing and adjusting the configuration of a fifth-wheel hitch.

BACKGROUND

The use of autonomous vehicles has become increasingly prevalent in recent years, with the potential for numerous benefits, including decreased commercial costs associated with shipping and logistics.

SUMMARY

What is needed is a reliable system or method for ensuring the proper position of a fifth-wheel hitch by detecting it position and, as applicable, automatically adjusting it, and without an operator visually inspecting or manually adjusting the hitch's position. The systems and methods of the present disclosure may solve the problems set forth above and, in addition, may solve other problems in the art that are not expressly listed above. However, the scope of the current disclosure is defined by the attached claims, and not by the ability to solve any specific problem.

Disclosed herein are techniques to autonomously manage a fifth-wheel hitch, including to automatically sense and, whenever applicable, adjust the position of the fifth-wheel hitch to a position corresponding to a predetermined balanced load configuration of a vehicle and any accessory coupled to it. Rather than relying on an operator to remember to inspect the hitch and manually perform any corresponding adjustments to its position, the present disclosure utilizes various sensors within, or proximate to, the fifth-wheel hitch to automatically sense and, if applicable, adjust the position of, or otherwise control the configuration for, the fifth-wheel hitch. The present disclosure may also determine whether a trailer is fully engaged in a throat of the fifth-wheel hitch of a vehicle, by automatically sensing if the jaws of the fifth-wheel hitch are in a fully closed position to lock the kingpin in the throat of the fifth-wheel and whether a manual release lever of the fifth-wheel hitch is in a fully locked position. Further, the present disclosure can utilize a system to control the operation of the truck based on one or more signals received from the sensors associated with (e.g., disposed within or proximate to) the fifth-wheel hitch and the relevant status of its individual components. For example, the present disclosure can utilize the system to prevent one or more operations of the vehicle until the position of the fifth-wheel hitch has been determined and, in some instances, adjusted based on the relevant operation of the vehicle and the desired position of the fifth-wheel hitch.

At least one aspect is directed to a method. According to one implementation, the method can include generating, by a processor, a first metric corresponding to a first signal from one or more first sensors, the first sensor configured to detect a position of a fifth-wheel hitch of a vehicle with the fifth-wheel hitch in a first position; generating, by the processor, a second metric corresponding to a second signal from a drive assembly, the drive assembly configured to reposition of the fifth-wheel hitch; generating, by the processor and based on the first and second metrics, a third metric, the third metric corresponding to a second position of the fifth-wheel hitch with a predetermined load balancing configuration; and transmitting, by the processor and responsive to a determination that the second position of the fifth-wheel hitch corresponds to a predetermined load balancing configuration of the vehicle, the third metric to the drive assembly. The method can include causing, by the processor and based on the third metric, the drive assembly to reposition the fifth-wheel hitch of the vehicle to the second position corresponding to the predetermined load balancing configuration of the vehicle. The method can include determining, by the processor and via the one or more first and second sensors, that the fifth-wheel hitch has been repositioned to the second position, wherein the second position corresponds to the fifth-wheel hitch positioned at the second notch. The method can include causing, by the processor and based on the third metric, a locking mechanism to engage and physically lock the fifth-wheel hitch in the second position. And the method can include causing, by the processor, the locking mechanism to disengage and physically release the fifth-wheel hitch to allow the drive mechanism to further reposition the fifth-wheel hitch.

At least one aspect is directed to a system. The system can include one or more first sensors; a drive assembly; and one or more processors. The system can generate a first metric corresponding to a first signal from the one or more first sensors, the first sensors configured to detect a position of a fifth-wheel hitch of a vehicle with the fifth-wheel hitch in a first position. The system can generate a second metric corresponding to a second signal from the drive assembly, the drive assembly configured to control the position of the fifth-wheel hitch. The system can generate, based on the first and second metrics, a third metric, the third metric corresponding to a second position of the fifth-wheel hitch with a predetermined load balancing configuration. And the system can transmit, in response to a determination that the second position of the fifth-wheel hitch corresponds to the predetermined load balancing configuration of the vehicle, the third metric to the drive assembly.

At least one aspect is directed to a non-transitory computer readable medium. The non-transitory computer readable medium can include one or more instructions stored thereon and executable by a processor. The processor can generate a first metric corresponding to a first signal from one or more first sensors configured to detect a position of a fifth-wheel hitch of a vehicle, the fifth-wheel hitch in a first position. The processor can generate a second metric corresponding to a second signal from a drive assembly, the drive assembly configured to adjust the position of the fifth-wheel hitch. The processor can generate, based on the first and second metrics, a third metric, the third metric corresponding to a second position of the fifth-wheel hitch with a predetermined load balancing configuration. And the processor can transmit, in response to a determination that the second position of the fifth-wheel hitch corresponds to a predetermined load balancing configuration of the vehicle, the third metric to the drive assembly.

BRIEF DESCRIPTION OF THE DRAWINGS

The accompanying drawings, which are incorporated in and constitute a part of this specification, illustrate various examples and together with the description, serve to explain the principles of the disclosed examples.

DETAILED DESCRIPTION

Aspects of this technical solution are described herein with reference to the figures, which are illustrative examples of this technical solution. The figures and examples below are not meant to limit the scope of this technical solution to the present implementations or to a single implementation, and other implementations in accordance with present implementations are possible, for example, by way of interchange of some or all of the described or illustrated elements. Where certain elements of the present implementations can be partially or fully implemented using known components, only those portions of such known components that are necessary for an understanding of the present implementations are described, and detailed descriptions of other portions of such known components are omitted to not obscure the present implementations. Terms in the specification and claims are to be ascribed no uncommon or special meaning unless explicitly set forth herein. Further, this technical solution and the present implementations encompass present and future known equivalents to the known components referred to herein by way of description, illustration, or example.

One challenge faced by autonomous vehicles is determining the position of a trailer connection, the point at which a trailer or other implement or accessory connects to the vehicle, and adjusting the position of that connection to provide a particular distribution of the vehicle's weight, including weight of the vehicle and, as applicable, any specialized equipment, the vehicle's trailer(s), and the vehicle's load. Trailers are coupled to trucks by a fifth-wheel hitch. Currently, truck operators perform a visual inspection, conduct a "tug test" to verify that a trailer is properly coupled to the fifth-wheel hitch, and manually adjust the position of the fifth-wheel hitch. However, this method currently requires the on-site presence of an operator to conduct the inspection, manually adjust the position of the fifth-wheel hitch, and conduct a "tug test." This leads to increased costs, increased personnel requirements, delayed operating times, and greater personnel requirements. Further, a visual inspection, manual adjustment, and "tug test" will not be feasible as trucks become more autonomous, operators are not onsite during the hitching of trailers to trucks, and the position of the fifth-wheel hitch is not measured. Further, the increasing use of aerodynamic technologies may make it difficult to physically access the fifth-wheel hitch to manually adjust its position or to visually confirm a proper coupling or a correct hitch position.

Figure 1:
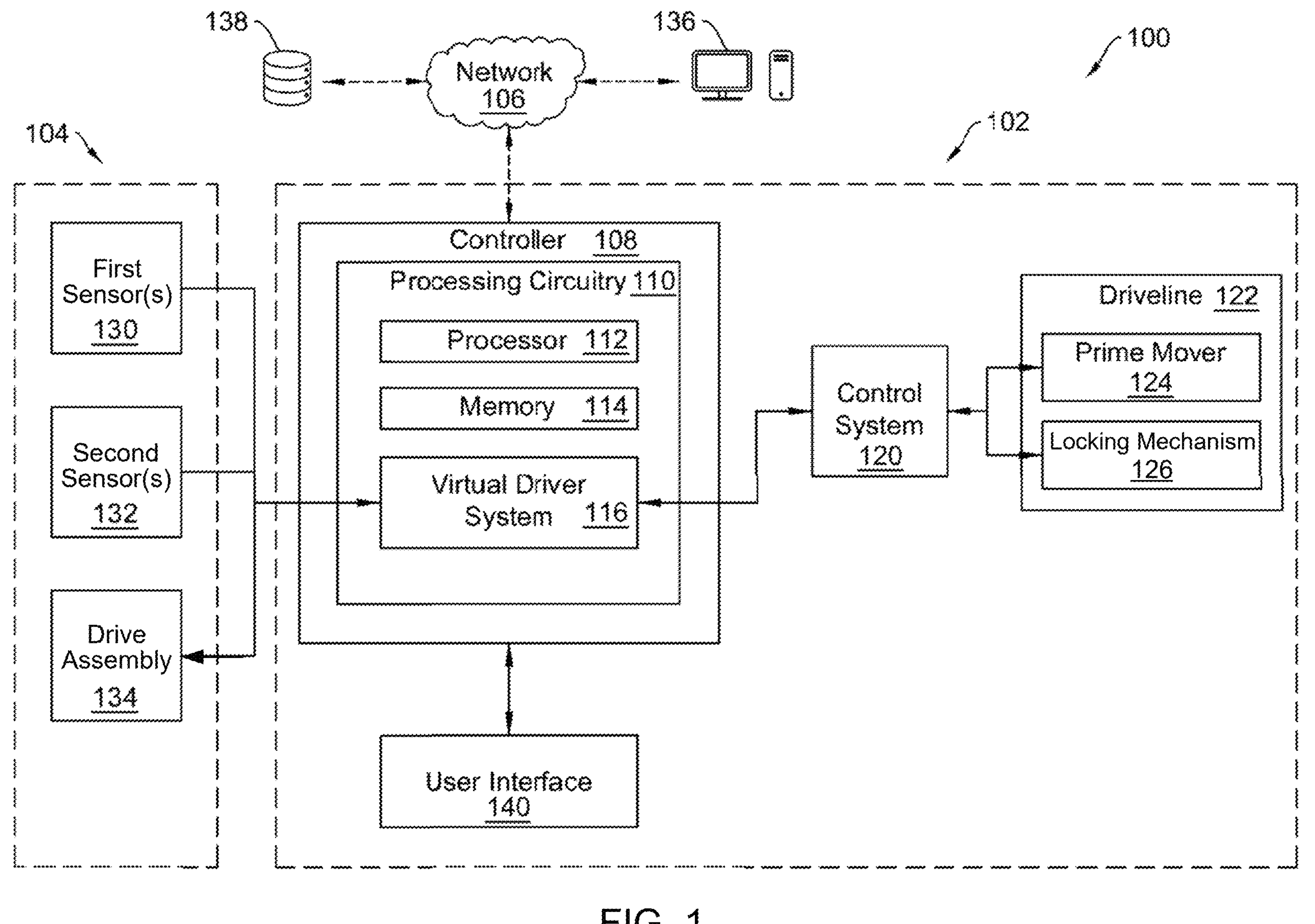
FIG. 1 depicts an automatic hitch-position system architecture, in accordance with present implementations.

FIG. 1, the present disclosure relates to an automatic hitch-position system 100 of vehicle 102. The management system 100 may include the vehicle 102 a coupling receiver 104, and a network 106.

The vehicle 102 may include a controller 108, a control system 120, and a driveline 122. In some examples, the vehicle 102 is an autonomous tractor trailer.

As will be described in detail herein, the control system 120 may be used to control the operation and operating parameters of the driveline 122. The driveline 122 may comprise a prime mover 124 and a locking mechanism 126. The coupling receiver 104 may include, among other things, one or more first sensors 130, one or more second sensors 132, and a drive assembly 134. The network 106 may be communicably coupled to the vehicle 102 by way of the controller 108. The controller 108 may include a network interface to facilitate receiving data from, and transmitting data to, network 106. Network 106 may also be communicatively coupled to a remote user device 136 and/or a database 138.

While this disclosure refers to a vehicle 102 (e.g., a tractor trailer) as an autonomous vehicle, it is understood that the vehicle 102 could be any type of vehicle including an automobile, a mobile industrial machine, etc. While the disclosure will discuss a self-driving or driverless autonomous system, it is understood that the autonomous system could alternatively be semi-autonomous having varying degrees of autonomy or autonomous functionality.

Controller 108 may comprise processing circuitry 110, the processing circuitry 110 including a processor 112, a memory 114, and a virtual driver system 116.

The processor 112 of controller 108 may be embodied as one or more of a data processor, a microcontroller, a microprocessor, a digital signal processor, a logic circuit, a programmable logic array, or one or more other devices for controlling the automatic hitch-position system 100 in response to one or more of the system inputs. Automatic hitch-position system 100 may include a single microprocessor or multiple microprocessors that may include means for identifying and reacting to various engagement statuses of coupling receiver 104, as transmitted by sensors 130 and 132 or drive assembly 134. Numerous commercially available microprocessors can be configured to perform the functions of the automatic hitch-position system 100. It should be appreciated that automatic hitch-position system 100 could include a general machine controller capable of controlling numerous other machine functions. Alternatively, a special-purpose machine controller could be provided. Further, the automatic hitch-position system 100, or portions thereof, may be located remote from the automatic hitch-position system 100, such as at database 138 or remote user device 136. Various other known circuits may be associated with the automatic hitch-position system 100, including signal-conditioning circuitry, communication circuitry, actuation circuitry, and other appropriate circuitry.

The processor 112 may be a device that performs mathematical operations and logical operations on data. In some examples, it is an electronic circuit that receives input data, processes it, and produces output data. The processor 112 may consist of a central processing unit (CPU), which performs the calculations, and other supporting circuits, such as memory 114, virtual driver system 116, user interface 140, and bus controllers.

The CPU may be responsible for executing instructions. It consists of an arithmetic logic unit (ALU) that performs arithmetic and logical operations, and a control unit (CU) that controls the flow of instructions and data within the processor. The ALU performs operations such as addition, subtraction, multiplication, division, and logical operations like AND, OR, and NOT. The CU fetches instructions from memory 114, decodes them, and executes them.

The user interface 140 enable the processor 112 to communicate with other devices, such as keyboards, displays, storage devices, sensors 130, 132, drive assembly 134, control system 120, and network 106. These interfaces use protocols such as USB, Ethernet, and Wi-Fi to transfer data to and from the processor.

The bus controllers manage the flow of data between the CPU, memory 114, and input/output interfaces (e.g., user interface 140). They ensure that data is transferred efficiently and that multiple devices can share the same bus without interfering with each other.

The processor 112 may also include memory, which stores data and instructions that the processor 112 accesses during its operation. This memory can be volatile, like random-access memory (RAM), which loses data when power is turned off, or non-volatile, like read-only memory (ROM), which retains data even when power is turned off.

The memory 114 of automatic hitch-position system 100 may be integrated into processor 112, or simply be communicably coupled to processor 112. Memory 114 may store data and/or software routines that may assist the automatic hitch-position system 100 in performing its functions, such as the functions of the virtual driver system 116 and the method 400 described herein with respect to FIG. 4. Further, the memory 114 may also store data received from various inputs associated with the automatic hitch-position system 100, such as data from the one or more first sensors 130, one or more second sensors 132, and drive assembly 134.

The virtual driver system 116 may be embodied as a module, unit, system, or instructions to be executed by the processor 112. The virtual driver system 116 may be stored in memory 114 and, when executed, cause the processor to perform various functions, including the steps and methods of the automatic hitch-position system 100.

According to some examples, the virtual driver system 116 receives inputs from the first sensor(s) 130, second sensor(s) 132, drive assembly 134, remote user device 136, control system 120, and driveline 122. Additionally, the virtual driver system 116 may receive inputs from a local operator or user through user interface 140 housed in vehicle 102. For example, vehicle 102 may include one or more displays and one or more input devices. The one or more displays may be or include a touchscreen, an LCD display, a LED display, a speedometer, gauges, warning lights, etc. The one or more input device may be or include a steering wheel, a joystick, buttons, switches, knobs, levers, an accelerator pedal, a brake pedal, etc. These input devices may be used by the operator of vehicle 102 to interact with the vehicle 102 and control the virtual driver system 116 and/or controller 108.

According to some examples, the virtual driver system 116 receives sensor data from first sensor(s) 130, the second sensor(s) 132, and drive assembly 134. In some examples, the first sensor(s) 130, the second sensor(s) 132, and drive assembly 134 are cooperatively coupled to the coupling receiver 104, the coupling receiver 104 being further described herein. Sensor 130, 132 may be any sensor used to determine the presence of an object. In some examples, the sensors 130, 132 may be used to detect the presence of a metal object (e.g., a trailer king pin).

There are various sensors available that can detect the presence of metal in proximity, such as may be used for one or more of the first sensors 130, one or more of the second sensors 132, or one or more of both the first and the second sensors 130, 132. In some implementations, however, the various sensors (e.g., one or more of the first sensors 130 and/or one or more of the second sensors 132) may be configured to detect the position of the fifth-wheel hitch, yet they may each work in different ways to sense whether any metal objects, such as the fifth-wheel hitch, are present nearby.

For example, inductive proximity sensors use electromagnetic fields to detect the presence of metal within their sensing range. Inductive proximity sensors have various benefits in the present disclosures, including their ability to operate in a variety of working environments in which they are exposed to dirt, grease, grime, and other adverse conditions that may be present during operation of the system 100 (e.g., conditions commonly associated with commercial tractor trailers). For example, the functionality of the one or more first and second sensors can avoid appreciably decreasing with the presence of these external elements and adverse conditions. In some examples, one or more of the first and/or second sensors 130, 132 may be used to detect the presence of metals and various alloys through the electromagnetic field associated with those materials and that the one or more of the sensors 130, 132 may be configured to detect.

In some examples, one or more Hall-effect sensors can be used (e.g., as one or more of the first and/or second sensor(s) 130, 132) to detect changes in the magnetic field detected by the Hall-effect sensor(s), which is caused by a metal object disposed within the magnetic field sensed by the Hall-effect sensor. In some examples, therefore, one or more Hall-effect sensors may be configured to detect the position of the fifth-wheel hitch by detecting whether any changes in the magnetic field have been caused by a nearby magnet, or a current-carrying conductor, positioned on, or fastened to, the fifth-wheel hitch (e.g., one or more magnets disposed on the fifth-wheel hitch and configured to enable the hall-effect sensor(s) to detect when the fifth-wheel hitch is near any of the Hall-effect sensor(s)). In some examples, the one or more Hall-effect sensor(s) include a thin rectangular semiconductor material with a small strip of metal on one side, which acts as the sensor's contact surface and can be mounted, for example, near one of the notches 214 of the fifth-wheel hitch 200. For those examples, when a magnetic field is present close to the semiconductor material and the metal strip, it causes a buildup of charge carriers on one side of the semiconductor and a corresponding depletion of charge carriers on the opposite side. The resulting voltage difference between the two sides of the semiconductor can be, for example, proportional to the strength of the magnetic field. The voltage difference can be measured by the Hall-effect sensor(s) to detect whether a magnetic field is present and, if so, its strength (e.g., whether the strength of the magnetic field exceeds a threshold used to determine whether the sensor output is "positive" or "negative").

In some examples, either of the first sensor(s) 130 or the second sensor(s) 132, or both, can include one or more magnetic sensors configured to detect changes in magnetic fields caused by metal objects present within a sensor's vicinity. The one or more magnetic sensors can be configured to detect a position of the fifth-wheel hitch by detecting any changes in a sensor's magnetic field. For example, the one or more magnetic sensors can be configured to detect changes in a magnetic field caused by any nearby magnetic, or ferromagnetic, materials. And each of the one or more magnetic sensors may further comprise a magnetic field sensor and supporting signal processing electronics (e.g., processor 112) to provide, based on the measurements of nearby magnetic fields, the sensor output. More specifically, when a magnetic or ferromagnetic material is present within the sensing range of the sensor, it causes a change in the magnetic field, which is detected by the magnetic field sensor. The sensor then converts this change in magnetic field into an electrical signal, which is processed by the supporting electronics. In some examples, one or more different methods can be used to detect the changes in the magnetic field and, as a result, the corresponding position of the fifth-wheel hitch. In some examples, the methods used to detect the changes in a magnetic field can depend on the type of magnetic sensor(s) used. For example, one implementation may include one or more magnetic sensors configured to detect the position of the fifth-wheel hitch with magnetoresistive elements, which have an electrical resistance that changes in the presence of a magnetic field and enables, as a result, measuring the magnetic field with the voltage corresponding to the resistance of the magnetoresistive elements.

In some examples, either the first or second sensor(s) 130, 132, or both, may include one or more ultrasonic sensors, which are configured to detect the position of the fifth-wheel hitch based on measurements of high-frequency sound waves. In those examples, the one or more ultrasonic sensors may be configured to detect the position of the fifth-wheel hitch based on measurements of high-frequency sound waves that will bounce off the fifth-wheel hitch if it is near one of the ultrasonic sensors. In some examples, the sensors 130, 132 may include one or more ultrasonic sensors that are each fixedly positioned at one of the notches used to position the fifth-wheel hitch (e.g., described below with reference to, and illustrated in, FIGS. 2A and 2B).

In some examples, each of the one or more ultrasonic sensors may be configured to detect the position (and/or configuration) of the fifth-wheel hitch based on measurements of ultrasonic sound waves that will reflect back towards the sensor if an object is present nearby. In some examples, each of the one or more ultrasonic sensor(s) can determine whether the fifth-wheel hitch is positioned at that sensor by determining whether the measured distance between the sensor and the fifth-wheel hitch does not exceed a threshold value. For example, the sensor may determine that the fifth-wheel hitch is not positioned at the location of that sensor if the distance between the sensor and the hitch is greater than a centimeter or, in other examples, 0.50 centimeters, 2 centimeters; the specific threshold value, however, is not limited to these examples and it may be any value suitable for detecting the position of a fifth-wheel hitch. In some examples, the one or more ultrasonic sensors (e.g., of the first and/or second sensors 130, 132) may operate in different modes, including, for example, a continuous mode where the sensor continually emit sound waves to detect any objects in their path; and, alternatively, pulse mode where the sensor only emits sound waves, or detects objects, at set intervals (e.g., every ten seconds, every 30 seconds, every ten minutes, or once when the vehicle 102 begins its operation, etc.). In addition, in some examples, the first and second sensors 130, 132 may include any type of direct distance measurement sensor, such as one or more laser range finders, stereo cameras, LiDAR, RADAR, and the like, and may include detecting position of the fifth-wheel hitch via image processing on a single camera image of a fixed object with a reference point (e.g., processing a single camera image to determine the angular size of a fixed object on the fifth-wheel hitch within the reference frame of the vehicle 102).

In some examples, the one or more first sensors 130 and the one or more second sensors 132 may all comprise the same (e.g., a single) type of sensor. In some examples, however, one or more of the first sensor(s) 130, one or more of the second sensor(s) 132, both the first and the second sensor(s) 130, 132, and including one or more of any sensor(s) associated with the drive assembly 134, may include any number of different sensors or types of sensors. For example, one or more of the first sensor(s) 130 may be an inductive proximity sensor(s), capacitive sensor(s), and distance measurement sensor(s) and, at the same time, one or more of the second sensors 132 may be a hall-effect sensor and another sensor of the second sensors 132 may be an optical sensor. In some examples, therefore, one or more of the first sensor(s) 130 may be different types of sensors (e.g., the first sensor(s) 130 may include one or more capacitive sensors and one or more hall-effect sensors). Similarly, some examples may include one or more second sensor(s) 132 that are different types of sensors. In some implementations, therefore, the first sensors 130, the second sensors 132, or both, may comprise any number sensors that may each be any type of sensor, which is configured for a system to automatically manage (e.g., detect and control) the configuration of a fifth-wheel hitch.

Figure 2A:
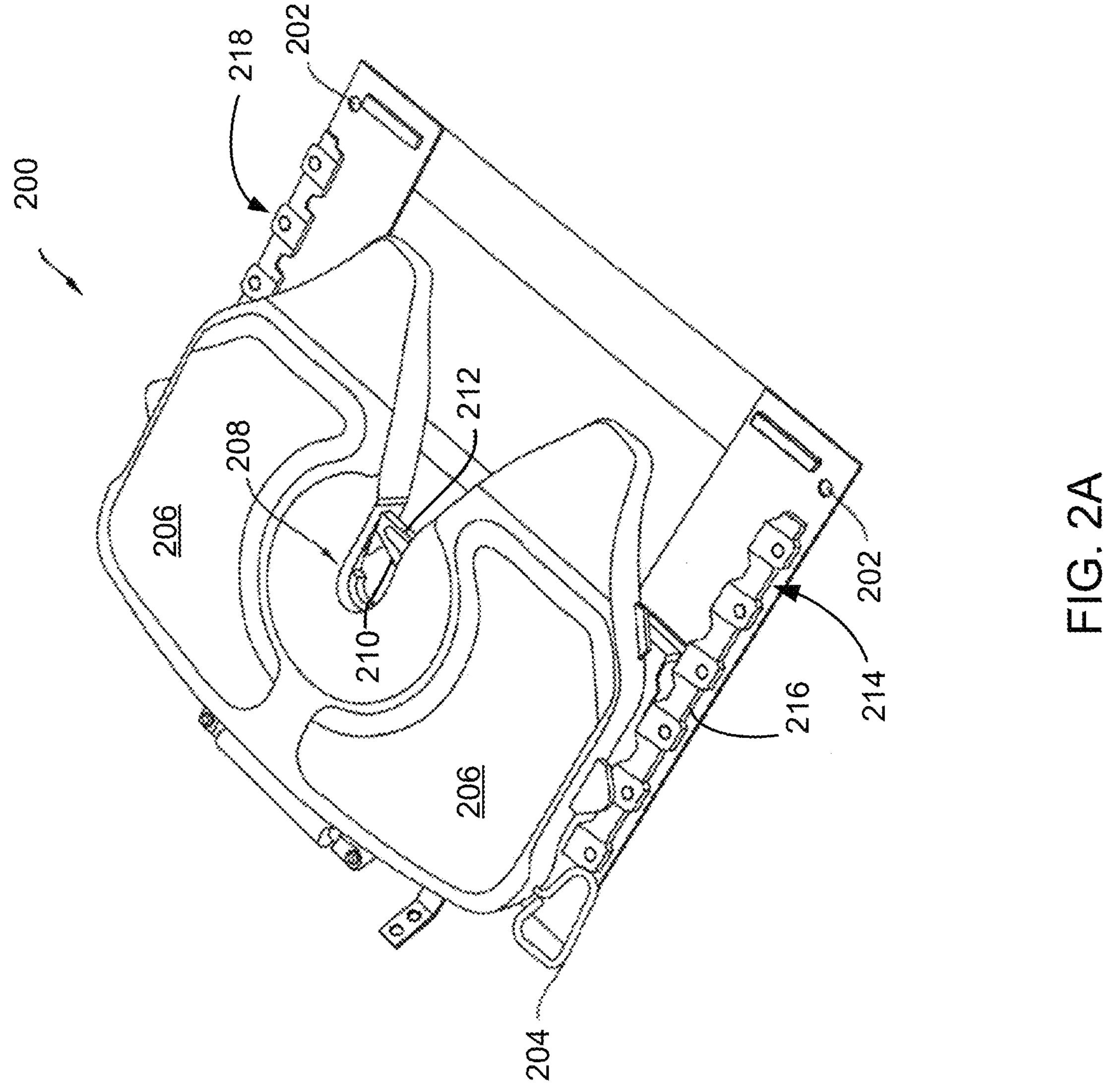
FIG. 2A depicts an example fifth-wheel hitch viewed from a first perspective, in accordance with present implementations.
Figure 2B:
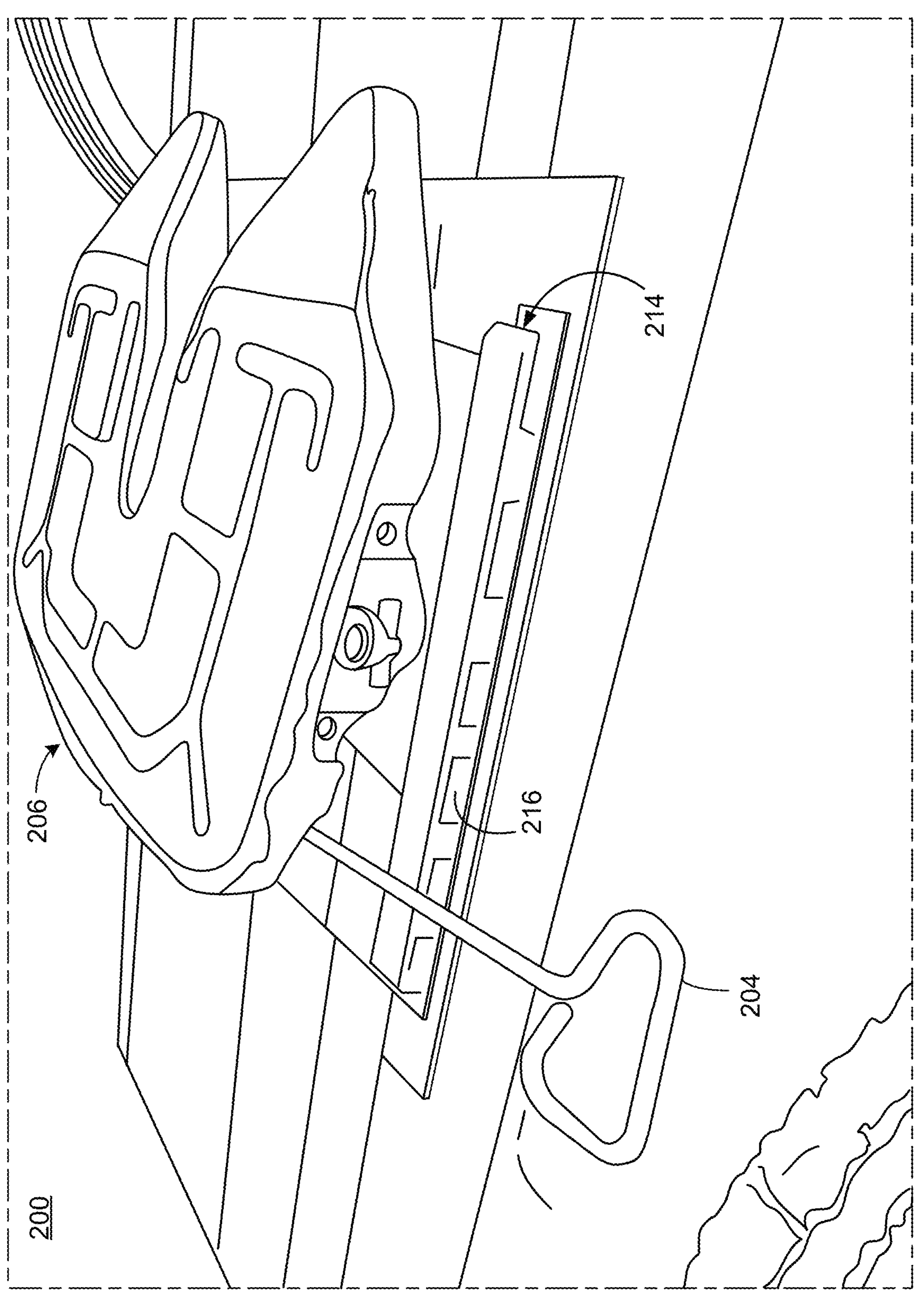
FIG. 2B depicts an example fifth-wheel hitch physically attached to a vehicle and viewed from a second perspective, in accordance with present implementations.
Figure 3A:
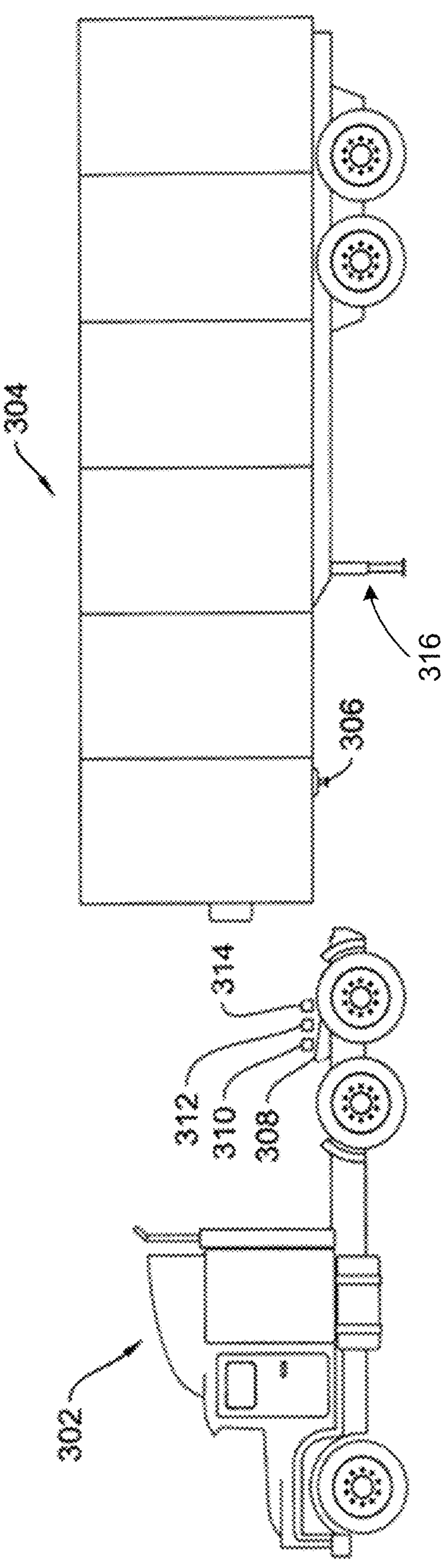
FIG. 3A is a left-hand view of a vehicle disconnected from its trailer and configured to automatically manage a fifth-wheel hitch, in accordance with present implementations.
Figure 3B:
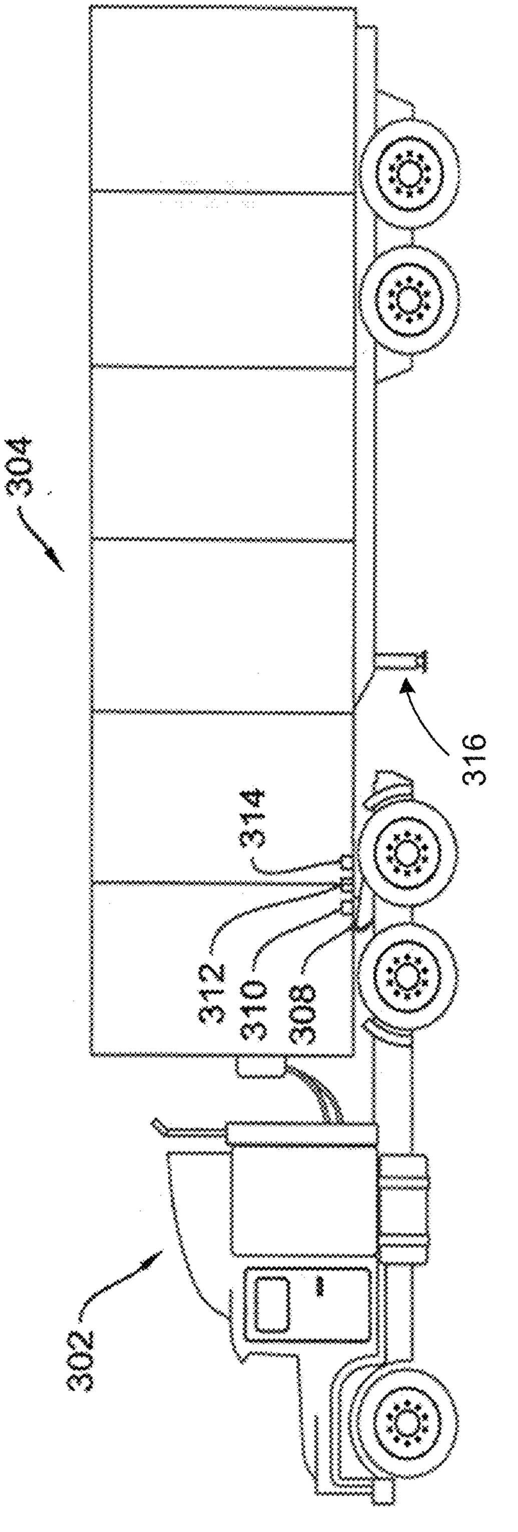
FIG. 3B is a left-hand view of a vehicle connected to a trailer and configured to automatically manage a fifth-wheel hitch, in accordance with present implementations.

In some examples, the first sensor(s) 130 are configured to sense the position of a fifth-wheel hitch, or coupling receiver 104 that is configured to receive a coupling unit (e.g., coupling unit 306 of FIG. 3A-B). The coupling unit 306, in some implementations, is a king pin of trailer, which can be coupled with, or physically connected to, the fifth-wheel hitch of a vehicle (e.g., with the fifth-wheel hitches shown in FIGS. 2A and 2B). The coupling receiver 104 (e.g., including, but not limited to, a fifth-wheel hitch) is configured to receive the coupling unit 306 and lock it in place. In some examples, and as described above, the coupling receiver 104 may be or it may include a fifth-wheel hitch of a tractor trailer (e.g., the examples of fifth-wheel hitches shown in FIGS. 2A and 2B). In some examples, the coupling receiver 104 may be, or may include one or more of a ball hitch, a pintle hitch, a gooseneck hitch, a weight distribution hitch, a bumper hitch, a tow bar, and a tow hook.

The one or more second sensor(s) 132 may be configured detect the position of the coupling receiver 104 and may, in some examples, be configured to detect whether the position of the coupling receiver 104 has been locked by the locking mechanism 126, which may include detecting whether the coupling receiver 104 has locked the position of, or has physically secured a connection with, the coupling unit 306 (e.g., the kingpin of a trailer), as further described below and with reference to FIGS. 2A-3B.

In some examples, the drive assembly 134 may also be configured to detect whether a coupling receiver 104 release lever (e.g., manual actuator) is in the locked position.

FIG. 2A depicts an example of a fifth-wheel hitch 200 as viewed from a first perspective, in accordance with present implementations. FIG. 2B depicts fifth-wheel hitch 200 physically attached to a vehicle from a second perspective, in accordance with present implementations.

The fifth-wheel hitch 200 illustrated in FIGS. 2A and 2B is one example of the coupling receiver 104, which, as described above with reference to FIG. 1, can also include (e.g., in addition to the fifth-wheel hitch 200) one or more first sensor(s) 130, one or more second sensor(s) 132, and the drive assembly 134. The fifth-wheel hitch 200 includes one or more mounting point(s) 202. The mounting points 202 are configured to accept (e.g., physically receive) a bolt, fastener, or other mounting hardware to cooperatively couple the fifth-wheel hitch 200 to a mount, or base of the hitch 200. In some examples, the fifth-wheel hitch 200 can include or more portions that can be moved, slid, or otherwise repositioned, to adjust the position of the hitch 200, which may occur, in some examples, with the hitch 200 attached to the vehicle (e.g., mounted on, coupled to, or otherwise fixedly placed on, a portion of the vehicle, which may include, for example, fastening the fifth-wheel hitch to the vehicle at mounting points 202) vehicle. In some examples, the fifth-wheel hitch 200 is coupled to a moveable mount (e.g., a sliding plate) that is, in turn, physically secured to, or mounted onto, the vehicle. While a fifth-wheel hitch 200 is illustrated and described herein, it should be understood that the concepts and features of the present disclosure extend to any and all examples of the coupling receiver 104 as described herein and elsewhere.

Fifth-wheel hitch 200 further includes top plates 206. Top plates 206 are configured so as to allow the trailer to rest thereon. In some examples, top plates 206 include integrated grooves to allow for grease to be placed therein to provide lubrication between the trailer and the top plates 206. This lubrication aids rotation of the trailer with respect to the fifth-wheel hitch 200 during operation. Fifth-wheel hitch 200 includes a throat 208, into which the coupling unit (e.g., the king pin of a trailer) may engage. Stated differently, the fifth-wheel hitch 200 can include a throat 208 that is configured to receive and lock in place or securely engage, the kingpin. Locking jaw 212 and engaging jaw 210 may cooperatively engage to lock the king pin into the throat 208. In some examples, only one jaw 210, 212 is needed to lock the king pin into the throat 208. According to an embodiment, the jaws 210, 212 may be autonomously engaged to lock the king pin into the throat 208. The virtual driver system 116 of FIG. 1 may contain instructions that allow for the autonomous locking of the position of the fifth-wheel hitch 200, which may include autonomous locking the fifth-wheel hitch in one or more of the notches 214 (e.g., locking the fifth-wheel hitch in the position at notch 216). For example, upon the processor 112 receiving a signal that one or more sensor(s) (e.g., one or more first sensors 130) has detected the presence of the fifth-wheel hitch, which may include associated objects/elements (e.g., a kingpin) at, or near, the location(s) corresponding to the sensor(s) (e.g., detecting a portion of the hitch 200 at notch 216 of the plurality of linearly disposed notches 214), the processor 112 may transmit a signal to the control system 120 to engage the jaws 210, 212 of FIGS. 2A and 2B. Upon engaging them, the second sensor(s) 132 may transmit a signal indicating that the jaws 210, 212 are fully engaged and locked into position. The processor 112 then transmits instructions to control system 120 to allow the operation of the driveline 122, first to allow performance of the tug test and, if successful, to continue operating the vehicle accordingly.

The configuration of the fifth-wheel hitch 200 is configured to be controlled, or managed, autonomously through the drive assembly 134 and, in some examples, using one or more actuators or other actuating elements (e.g., via a hydraulic system on vehicle 102 and configured to reposition the fifth-wheel hitch 200). For example, a hydraulic system on the vehicle 102 may use cylinders and pistons to linearly actuate, adjust, and otherwise reposition, one or more elements of the fifth-wheel hitch. For example, a hydraulic system of the vehicle 102 may be configured to adjust, or control, the position of the fifth wheel hitch at one or more notches disposed notches associated with a plurality of discrete positions. Moreover, in some examples, the hydraulic system of the vehicle 102 can close the jaws 210, 212 against each other and lock them in place. Alternatively, the configuration of the hitch 200, or any of its individual elements (e.g., jaws 210, 212, drive assembly 134, locking mechanism 126, etc.) may be controlled, adjusted, engaged, and/or physically adjusted (e.g., rotating, sliding, engaging, locking, opening, linearly repositioning, etc.) using the vehicle 102 hydraulic system.

In other examples, the jaws 210 may be actuated pneumatically (e.g., using the air compression system of vehicle 102), electromagnetically (e.g., using solenoids or relays), or electromechanically (e.g., using a motor, ball screw, lead screw, etc.).

As described above, some examples may include the fifth-wheel hitch 200 with one or more sensors (e.g., one or more first sensors 130) that are each disposed at one or more notches of the plurality of linearly positioned notches 214.

For example, positioning sensors (e.g., first sensors 130, second sensors 132, etc.) may each be configured to sense the presence of the fifth-wheel hitch, or a portion thereof, (e.g., a notch connector, locking mechanism, etc.) near the location associated with that sensor (e.g., a hall-effect sensor, mounted to one of the notches 214, may detect the presence of the fifth-wheel hitch positioned at that notch). Again, as described above with reference to FIG. 1, the sensors of the fifth-wheel hitch (e.g., one or more of the first and/or second sensor(s) 130, 132) may include a plurality of inductive proximity sensors, according to one example, which may each correspond to a different notch from the linear plurality of notches 214. The inductive proximity sensors may be configured to sense the inductive capacitance of the material that forms the fifth-wheel hitch 200 (e.g., a metal coupling portion of the fifth-wheel hitch 200) that is present near the corresponding inductive proximity sensor, which can each be associated with, and configured to operate/sense at, corresponding notches of the several linearly positioned notches 214. In some examples, the hitch 200 may be detected by an inductive proximity sensor in response to the presence of hitch 200, or a portion thereof, at the notch (e.g., notch 216) corresponding to that proximity sensor. The sensor(s) (e.g., one or more first and/or second sensors 130, 132) may then transmit a signal through a data cable to a processor (e.g., processor 112 of FIG. 1). For example, the inductive proximity sensor(s) (e.g., one or more of first and/or second sensors 130, 132) may transmit an engaged, or 'true', status when the fifth-wheel hitch is engaged with, or present at, the notch (or notches) corresponding to those same sensors and the sensors senses the fifth-wheel hitch in, or nearby, the corresponding one or more of the notches 214. In some examples, the sensors of the hitch 200 (e.g., first and/or second sensors 130, 132) can be configured to return a non-engaged, 'false,' or absent, status when no portion of the fifth-wheel hitch, or any other metal material, is sensed at the notch(es) corresponding to those sensors.

A manual lock sensor (e.g., of locking mechanism 126) may be configured to sense the position of locking mechanism 126. Manual lock sensor may be cooperatively coupled to the actuating mechanism or the coupling receiver 200. In either embodiment, the manual lock sensor senses an engagement of the actuating mechanism 126. In some examples, manual lock sensor is not utilized in the automatic hitch-position system. In some examples, the manual lock sensor is a backup engagement verification. Manual lock sensor is configured to sense that actuating mechanism is in an engaged position, thus eliminating the chance of a false positive reading from jaw sensor 214. By verifying the overall engagement status with the one or more sensors of the hitch 200, the operator or virtual driver system may be able to ensure that the coupling unit has a position corresponding to a predetermined load balancing configuration and may determine that the coupling unit is engaged in coupling receiver 200 and locked into position. Manual lock sensor can transmit the engagement status to the processor by a data cable. As with the other sensors, the manual lock sensor may communicate with the processor wirelessly instead of by the data cable.

Returning now to FIG. 1, upon the virtual driver system 116 receiving the sensor data from sensors 130, 132, the processor 112 executing virtual driver system 116 may determine an overall engagement status of the coupling receiver 104 (e.g., coupling receiver 200 of FIGS. 2A and 2B and coupling receiver 308 of FIGS. 3A and 3B). In some examples, the signal(s) output from one or more sensor(s) may be comprised of one or more binary values. For example, either the fifth-wheel hitch is present at one of the several notches 214 or it is not present at that notch. For example, the coupling unit is either fully engaged and locked with the coupling receiver 104 or the coupling unit is not fully engaged and locked with the coupling receiver 104. In this embodiment, the first and/or second sensors 130, 132 can be configured to transmit to virtual driver system 116 a position signal for each of the linearly plurality of notches (e.g., notches 214 of FIG. 2A), an engagement signal (e.g., the presence of the coupling unit, a locked position, etc.), and the like. In some examples, if one or more kingpin sensors (e.g., one or more of the first and second sensors 130, 132) transmit an engagement signal, then the virtual driver system 116 determines that the coupling receiver 104 is coupled to the coupling unit. Upon determining engagement, the processor 112, in executing the virtual driver system 116, transmits a signal to the control system 120 to allow the driveline 122 of vehicle 102 to operate. If a kingpin, or coupling unit sensors, (e.g., of the first and second sensors 130, 132) transmits a signal of non-engagement, then processor 112 may transmits a signal to the control system 120 to prevent, or otherwise disable, operation of the driveline 122 of the vehicle 102.

In some examples, a vehicle may reposition the fifth-wheel hitch 200 by disengaging the lock on the position of the fifth-wheel hitch 200 (e.g., locking mechanism 126) with the vehicle fifth-wheel hitch connected to a trailer (e.g., as detected by one or more of the first and second sensors 130, 132) and moving the vehicle until the fifth-wheel hitch falls into, or otherwise present at, the correct notches and re-engaging the lock on the position of the fifth-wheel hitch before performing a tug test.

In some examples, the virtual driver system 116 may have multiple drive modes. For example, the virtual driver system 116 may have a non-coupled mode (e.g., operating the vehicle 102 without an accessory coupled to the vehicle 102), a coupling mode (e.g., attempting to couple an accessory to the vehicle 102 via the coupling receiver 104), a coupled mode (e.g., operating the vehicle 102 when coupled to an accessory), and an override mode (e.g., to manually override the safety protocols of virtual driver system 116).

In the non-coupled mode, the virtual driver system 116 may or may not receive transmitted information from the sensors 130, 132. The virtual driver system 116 will not determine the engaged status of the sensors 130, 132 or the coupling receiver 104. The virtual driver system 116 will allow the operator or vehicle 102 to operate the vehicle 102 without restrictions. This applies to whether the vehicle 102 is manually or autonomously operated (e.g., without human intervention). The operator may selectively determine, through the user interface 140 or remote user device 136 the mode in which the vehicle 102 will be operated (whether manually or autonomously). In some examples, the controller 108 may autonomously determine what mode to operate the vehicle 102 in. The remote user device 136 or user interface 140 may display the operating mode for the operator. In some examples, the operator may choose the mode through the use of the remote user device 136 or user interface 140.

In the coupling mode, the virtual driver system 116 will begin receiving and/or communicating the engagement status from the sensors 130, 132. The processor 112 may also transmit instructions to the user interface 140 to display the engagement status to an operator of vehicle 102. The user interface 140 may then display the engagement status. The status may be displayed to the user visually (e.g., with a lock icon or unlock icon, with colors, flashing lights, text, etc.), aurally (e.g., beeping, tones, diction, etc.), or haptically (e.g., vibrations, etc.). In some examples, the user interface 140 displays to the operator the engagement status of one or more sensor(s) 130, 132. In some examples, the user interface 140 displays the overall status of the coupling unit based on the engagement status of each of the one or more sensors 130, 132.

The user interface 140 may display red when any one of the one or more sensors 130, 132 transmits a non-engaged status, an unbalanced load configuration status, or other status. Upon each transmitting an engaged status (i.e., the coupling unit is in the throat of the coupling receiver 104, the jaws of the coupling receiver 104 are fully engaged and in the locked position, and the manual release lever and actuating mechanism are in the locked and engaged position), then the display may present a green screen, a locked icon, or a green lock icon. In some examples, if at least one of the sensors 130, 132 (but not all) transmit a position corresponding to a balanced load status, ambiguous/unknown position status, position adjustment complete, and an engaged status (e.g., locking mechanism 126 engaged status, kingpin lock engaged status, etc.) then the user interface 140 may display a yellow color (e.g., display a yellow color within one or more margins or other regions of the user interface 140), one or more yellow icons, and/or one or more user notifications. In other examples, any color or icon may be used to communicate to the operator any of the engagement status of the coupling unit.

In some embodiments, the feedback to the operator regarding the engagement status of the coupling receiver 104 is aural. In this embodiment, the user interface 140 may generate various audio signals to communicate to the operator the engagement status of the coupling receiver 104. For example, upon the virtual driver system 116 being put into the coupling mode, the user interface 140 may begin beeping. Once a predetermined one or more of sensors 130, 132, transmit an engaged status, the user interface 140 may begin playing a solid tone. In some embodiments, the user interface 140 may emit diction with preselected phrases to communicate to the operator the status of one or more sensors 130, 132. For example, the user interface 140 may emit the phrase, "king pin detected," when the coupling unit is detected by sensors 130, 132. The user interface 140 may then emit the phrase, "jaws engaged," when a jaw sensor senses and transmits the engagement of locking jaw 212 and/or engaging jaw 210. The user interface 140 may then provide one or more messages (e.g., emit one or more of the phrases, "manual release engaged", "coupling receiver repositioned," etc.) based on whether one or more of manual lock sensor, first sensors 130, second sensors 132, drive assembly 134, locking mechanism 126, and any other component(s) of the system 100, senses and transmits information regarding the configuration and/or operation of the system 100 (e.g., the position of the coupling receiver 104 and/or whether it is present near, and detected by, one or more of the sensors 130, 132). The examples described above are provided without limitation to other examples and the present disclosure is not limited thereto. Accordingly, in some examples, the virtual driver system 116 may transmit instructions to the user interface 140 to provide (e.g., emit, display, message, etc.) any phrase or other notification, in any language and in any voice, to help communicate relevant engagement information to an operator of the vehicle 102.

In some embodiments, the user interface 140 may emit haptic feedback to the operator upon entering the coupling mode. For example, upon entering into the couple mode, the user interface 140 may vibrate (either pulsing or continuously) until the sensors 130, 132 detect and transmit to the controller 108 an engaged status. Upon the sensors 130, 132 sensing and transmitting to the controller 108 an engaged status, the user interface 140 may adjust the haptic feedback to indicate an engaged status. For example, the user interface 140 may adjust from a pulsing vibration to a continuous vibration. In other examples, the user interface 140 may adjust from a continuous vibration to a pulsing vibration. In some examples, a steering mechanism is the user interface 140. In other examples, the seat is the user interface 140. However, the user interface 140 may be any device or element of the vehicle 102 or remote user device 136 to which the user is in physical contact during the coupling mode.

In some examples, the user interface 140 may communicate one or more of the previously described examples to the operator concurrently (e.g., both audio and visual communication).

Upon receiving the indication during the coupling mode that the coupling unit is fully engaged and locked into the coupling receiver 104, the virtual driver system 116 may enter into the coupled mode. In some examples, the virtual driver system 116 may only enter into the coupled mode if the sensors 130, 132 are transmitting an engaged status. In autonomous examples, the virtual driver system 116 automatically enters into the coupled mode upon receiving an engaged status from sensors 130, 132 during the coupling mode.

In some examples, if the operator attempts to enter into the coupled mode from the coupling mode prior to the virtual driver system controller 108 receiving an indication of engagement, the processor 112 may transmit instructions to the control system 120 to not allow the vehicle 102 to operate beyond specified parameters (e.g., above 10 miles per hour). The operator may be required to reenter coupling mode and attempt to couple the accessory again. In some examples, the vehicle 102 may be bounded to a location (e.g., a tractor trailer hub parking lot) when in the coupling mode, and the operating parameters (e.g., speed) may be limited while in coupling mode. This may ensure that once the virtual driver system 116 enters coupling mode, the accessory is fully engaged and locked to the coupling receiver 104 prior to leaving the geofenced area. In other examples, the coupling mode does not limit vehicle 102 operating parameters or location.

When in coupled mode, any restrictions during coupling mode may be removed from vehicle 102. For example, vehicle 102 may operate at full speed and leave any geofence restrictions. The vehicle 102 may travel to its final destination with the accessory fully engaged and locked to the coupling receiver 104. However, in some examples, certain restrictions may be placed on the vehicle 102 during coupled mode to restrict maneuverability, depending on the accessory coupled to vehicle 102 via the coupling receiver 104. For example, when the vehicle 102 is a tractor trailer and the accessory is a trailer, the maximum speed of the prime mover (e.g., engine) may be limited to avoid overheating. In other examples, the maximum ground speed may be limited to allow for safe stopping distances, based on the weight of the payload of the accessory. In other examples, steering angles may be limited to avoid jackknifing the trailer. In other examples, remote operator requirements may change based on the coupled status. For example, once the vehicle 102 is in the coupled mode, a remote operator using remote user device 136 may be required to perform a safety check remotely. In other examples, an operator overseeing the autonomous operation of vehicle 102 in coupled mode may need to have certain credentials above an operator overseeing the autonomous operation of vehicle 102 in non-coupled mode. For example, a more experienced operator may be required to oversee the autonomous operation of vehicle 102 when a trailer is coupled to the vehicle 102. This may be caused by the increased risk for personal or monetary injury when operating a payload. The above examples are for example purposes only, and should not be considered limiting, and it should be understood that various other restrictions may be placed on the vehicle 102 by the virtual driver system 116 during the coupled mode.

In the override mode, the operator or autonomous system (e.g., in some examples, the virtual driver system 116) may override the safety or limiting protocols of the previous modes. For example, an operator may choose to enter into the override mode of the virtual driver system 116 to remove the geofence or speed limits of the coupling mode. In other examples, the operator or virtual driver system 116 may choose to remove the steering limits of the coupled mode to make a specific turn.

In some examples, the operator must input a code (e.g., a password) to enter into the override mode. In other examples, an operator must have certain credentials (e.g., be a manager or IT personnel) before being able to override the virtual driver system 116 safety protocols.

Turning again to FIG. 1, the sensors 130, 132 may be communicably coupled to the controller 108 or virtual driver system 116 wired or wirelessly. The wireless connection may be a wireless communication signal (e.g., Wi-Fi, cellular, LTE, 5G, etc.). In some examples, the sensors 130, 132 are communicably coupled to the controller 108 by means of the vehicle 102 bus. Additionally, the sensor data may be communicated, by the controller 108 to the network 106 by way of a network interface. Through network 106, the sensor data from sensors 130, 132 may be stored and/or accessed by database 138 and remote user device 136.

In other examples, the virtual driver system 116 need not receive an engagement signal from each sensor 130, 132 in order to transmit a signal to control system 120 to allow the driveline 122 of vehicle 102 to operate beyond predetermined parameters (e.g., above a specified speed limit). For example, a coupling receiver 104 (e.g., a fifth-wheel hitch) may not include all of the one or more first and second sensors 130, 132 described herein. Instead, the coupling receiver 104 may include only a subset of the first and second sensors 130, 132. In other examples, the virtual driver system 116 may only need two of the plurality of one or more first and second sensors 130, 132 to determine a status of the fifth-wheel hitch. For example, sensor 134 may be a backup sensor to be used if one of the other sensors is not working.

In some examples, the user interface 140 may be used to display the engagement status of sensors 130, 132. Each sensor 130, 132 may transmit its engagement status to the controller 108. Processor 112 of controller 108 may transmit instructions to display the engagement status of each sensor 130, 132 to the user interface 140. Upon receiving the instruction to display engagement status, user interface 140 may display a graphical user interface displaying the engagement status of each sensor 130, 132. In some examples, the GUI will also display an overall engagement status, depending on the combined status of each sensor 130, 132. For example, the overall engagement status may show engaged when each sensor 130, 132 transmits an engaged status. The overall engagement status may show non-engaged when at least one of the sensors 130, 132 transmits a non-engaged status. In other examples, the GUI may display the overall engagement status depending on the virtual driver system 116 protocol which determines the engagement status based on engagement status of the sensors 130, 132.

While three separate sensors 130, 132 are described in some of the examples of the present disclosure for example purposes, it should be understood that in other examples a different number of sensors may be used. For example, in some examples, only one sensor may be used. In others, two sensors may be used. In others, four or more sensors may be used. The number of sensors described in various examples should not be construed as limiting in any way.

Upon determining an engagement status, the processor 112 transmits a signal to control system 120 to allow or not allow the driveline 122 to be operated, depending on the engagement status.

The control system 120 for the vehicle 102 is a system that manages and regulates the operation of various subsystems within the vehicle (e.g., prime mover 124 and locking mechanism 126). These subsystems may also include the engine, transmission, steering, brakes, and suspension, among others. The control system is responsible for monitoring the behavior of these subsystems, making adjustments as necessary, and ensuring that the vehicle operates safely and efficiently.

The control system uses various sensors (e.g., first and second sensors 130, 132) and actuators (e.g., drive assembly 134) to gather information about the state of the vehicle generally, and the configuration (e.g., position) of the fifth-wheel hitch specifically, and to make adjustments as appropriate (e.g., reposition the fifth-wheel hitch based on a position determined to correspond to a balanced load configuration). For example, a sensor might detect that the vehicle is traveling too fast and send a signal to the engine to reduce its power output. Similarly, an actuator might be used to adjust the position of the steering mechanism in response to changes in the road conditions.

In some examples, the controller 108 is integrated in control system 120. In other examples, the controller 108 and control system 120 are distinct components within vehicle 102. Control system 120 is configured to communicate information to controller 108, such as operating parameter status of the various subsystems of driveline 122 (e.g., engine speed of prime mover 124, locking action for locking mechanism 126, steering angle, temperature of prime mover 124, etc.).

In some examples, the virtual driver system 116 may be hosted on remote user device 136 or database 138. The processor 112 may access the virtual driver system 116 from database 138 or remote user device 136 through network 106. In other examples, controller 108 is integral to remote user device 136. In such examples, processor 112 transmits instructions to control system 120 through network 106 to operate the driveline 122 of vehicle 102. Virtual driver system 116 may be executed autonomously by controller 108 or may require additional user/operator input. For example, an operator of vehicle 102 may be required to accept or verify instructions from the processor 112 executing virtual driver system 116.

In some examples, the operator may override the instructions from processor 112 executing virtual driver system 116. For example, the operator may override the instructions to not allow operation of the vehicle 102 through the user interface of vehicle 102. In other examples, the operator is remote from vehicle 102 and may override the instructions by the remote user device 136.

FIGS. 3A-3B illustrates an embodiment of an automated management system 100 of FIG. 1 with a coupling receiver 308 and coupling unit 306. In FIG. 3A, a disengaged system 300 is shown, which includes a vehicle 302 and an accessory 304 (e.g., a trailer) that are physically disconnected from each other.

In some examples, the vehicle 302 may be a tractor trailer (e.g., as shown in FIGS. 3A and 3B) with a cooperatively integrated coupling receiver 308. As described in FIG. 1, the coupling receiver 308 may be any apparatus used for engaging with a coupling unit 306. As shown in FIGS. 3A-B, coupling receiver 308 may include a coupling unit sensor 310, a jaw sensor 312, and a drive assembly 314. Sensors 310, 312 may be one or more of any type of sensor previously described herein (e.g., above, with reference to FIG. 1) or any other sensor that can be configured to detect the position of a fifth-wheel hitch (e.g., configurable to detect whether the fifth-wheel hitch is physically present at one of the notches, which are used to set the position of the fifth-wheel hitch).

First sensor(s) 310, second sensor(s) 312, and drive assembly 314 may be communicably coupled to a controller (such as controller 108 of FIG. 1) housed locally on the vehicle 302. For example, one or more of the first sensor(s) 310, the second sensor(s) 312, and the drive assembly 314 may be configured for, or capable of, wireless communication via a network (e.g., network 106) and may include wireless communication (e.g., via the network) with either, or both, of a remote user device (e.g., remote user device 136) and a remote database (e.g., database 138).

The accessory 304 may be a trailer, as depicted in FIGS. 3A and 3B, with a coupling unit 306 and landing gear 316. In the disengaged system 300, which is depicted in FIG. 3A, the landing gear 316 may be in an extended position and in cooperation with the ground to support the accessory 304. In some examples, the coupling receiver 308 has one or more of the first sensor(s) 310, the second sensor(s) 312, and the drive assembly 314. In the example illustrated in FIG. 3A, the sensors 310, 312 and the drive assembly 314 may return a non-engaged status to a processor. In some examples (e.g., in examples substantially identical to the one depicted in FIG. 3A), the vehicle 302 may be configured in a coupling mode, as described above.

Turning now to FIG. 3B, an engaged system 301 is shown with the accessory 304 engaged with coupling receiver 308 (e.g., with the trailer 304 physically connected to the fifth-wheel hitch) of the vehicle 302. In the example shown in FIG. 3B, one or more of the first sensors 310, the second sensors 312, and the drive assembly 314 may transmit a signal to the processor regarding the configuration of the fifth-wheel hitch. For example, one or more of the sensors 310, 312, and the drive assembly may transmit a signal indicating that the coupling receiver 308 (e.g., a fifth-wheel hitch) is in a first position, the coupling unit 306 (e.g., king pin) is engaged in the throat of the coupling receiver 308, the jaw(s) of coupling receiver 308 is/are fully engaged and locked, and the manual release mechanism (e.g., locking mechanism 126 of FIG. 1) is in the locked (e.g., engaged) position.

In the engaged system 301, the landing gear 316 is in the retracted position and the accessory 304 rests on the coupling receiver 308 and is coupled to the coupling receiver 308 by the coupling unit 306 (shown in FIG. 3A). In this embodiment, the sensors 310, 312, 314 may transmit an engagement signal to the processor. For example, coupling unit sensor 310 may transmit a signal that the coupling unit 306 is detected in the coupling receiver 308. Jaw sensor 312 may transmit a signal that the jaw(s) of the coupling receiver 308 is/are in the engaged and locked position. And manual lock sensor 314 may transmit a signal that the manual release mechanism is in the locked position.

Figure 4:
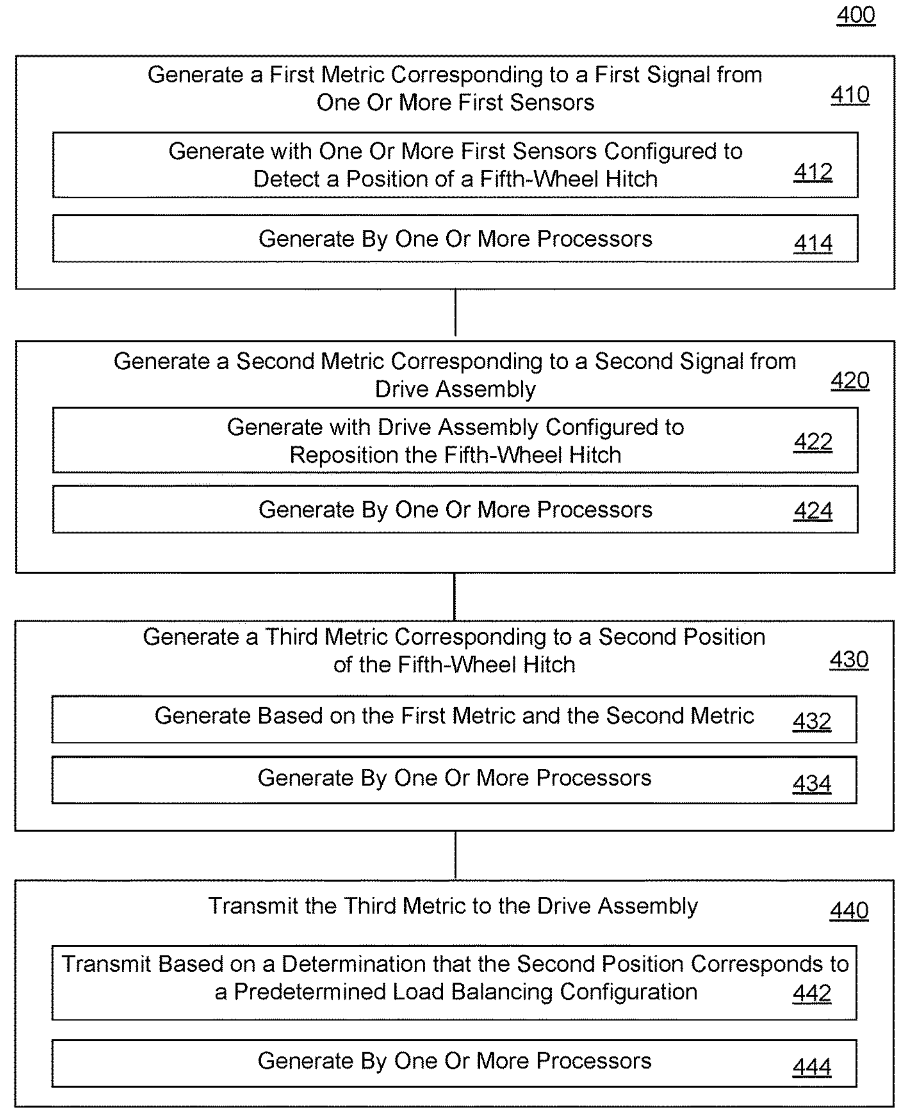
FIG. 4 depicts an example method of automatically managing a fifth-wheel hitch of an autonomous vehicle, in accordance with present implementations.

FIG. 4 shows the steps of a processor executing the virtual driver system 116 according to an embodiment. The method 400 shown in FIG. 4 comprises step 410, including steps 412 and 414; step 420, including steps 422 and 424; step 430, including steps 432 and 434; and step 440, including steps 442 and 444. However, other implementations of the methods disclosed herein may comprise additional steps, one or more alternative steps, and may omit one or more of the steps of the method 400 and shown in FIG. 4. Some implementations may perform one or more steps of the method 400 in any order and is not limited to any order of steps that may be present in, or implied by, the example method 400 depicted in FIG. 4. In some examples, the steps of method 400 may be performed simultaneously or near-simultaneously and, therefore, need not be performed sequentially. As described above, although the steps of the method 400 are shown in FIG. 4 with a particular organization, the steps of method 400 may be performed in any order. And, in some examples, one or more of the steps of method 400 may be optional and, therefore, omitted in some examples of the methods disclosed herein.

At step 410, the method 400 may generate, by a processor, a first metric corresponding to a first signal from one or more first sensors. At 412, the method 400 may generate the first metric with the one or more first sensors configured to detect a position of a fifth-wheel hitch of a vehicle. At 412, the method 400 can generate the first metric by the processor.

At 420 the method can generate a second metric corresponding to a second signal from a drive assembly. At 422, the method 400 can generate the second metric with the drive assembly configured to reposition of the fifth-wheel hitch. At 424, the method 400 can generate the second metric by the processor (e.g., by the processor and based on the second signal from the drive assembly).

At 430, the method can generate a third metric, the third metric corresponding to a second position of the fifth-wheel hitch. At 432, the method 400 can generate the third metric based on the generated first and second metrics. At 434, the method can generate the third metric, (e.g., as described above) by the processor. At 440, the method can transmit the generated third metric to the drive assembly. At 442, the method can transmit the third metric in response to a determination that the second position of the fifth-wheel hitch corresponds to a predetermined load balancing configuration of the vehicle. At 444, the method can transmit the third metric (e.g., as described above) by the processor.

The various illustrative logical blocks, modules, circuits, and algorithm steps described in connection with the examples disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Examples implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed examples is provided to enable any person skilled in the art to make or use the examples described herein and variations thereof. Various modifications to these examples will be readily apparent to those skilled in the art, and the principles defined herein may be applied to other examples without departing from the spirit or scope of the subject matter disclosed herein. Thus, the present disclosure is not intended to be limited to the examples shown herein but is to be accorded the widest scope consistent with the following claims and the principles and novel features disclosed herein.

While various aspects and examples have been disclosed, other aspects and examples are contemplated. The various aspects and examples disclosed are for purposes of illustration and are not intended to be limiting, with the true scope and spirit being indicated by the following claims.

Having now described some illustrative implementations, the foregoing is illustrative and not limiting, having been presented by way of example. In particular, although many of the examples presented herein involve specific combinations of method acts or system elements, those acts and those elements may be combined in other was to accomplish the same objectives. Acts, elements and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both "A" and 'B'. Such references used in conjunction with "comprising" or other open terminology can include additional items. References to "is" or "are" may be construed as nonlimiting to the implementation or action referenced in connection with that term. The terms "is" or "are" or any tense or derivative thereof, are interchangeable and synonymous with "can be" as used herein, unless stated otherwise herein.

Directional indicators depicted herein are example directions to facilitate understanding of the examples discussed herein, and are not limited to the directional indicators depicted herein. Any directional indicator depicted herein can be modified to the reverse direction, or can be modified to include both the depicted direction and a direction reverse to the depicted direction, unless stated otherwise herein. While operations are depicted in the drawings in a particular order, such operations are not required to be performed in the particular order shown or in sequential order, and all illustrated operations are not required to be performed. Actions described herein can be performed in a different order. Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Scope of the systems and methods described herein is thus indicated by the appended claims, rather than the foregoing description. The scope of the claims includes equivalents to the meaning and scope of the appended claims.

What is claimed is:

1. A computer-implemented method for controlling an autonomous vehicle comprising:

operating, by a virtual driver system of the autonomous vehicle, the autonomous vehicle in a coupling mode to couple a fifth-wheel hitch of the autonomous vehicle with a trailer, the autonomous vehicle being a roadway vehicle, operating the autonomous vehicle in the coupling mode further comprising:

detecting, via one or more first sensors of the autonomous vehicle, one or more positions of a fifth-wheel hitch of the autonomous vehicle;

generating, by a processor of the autonomous vehicle, a first metric corresponding to a first signal received from the one or more first sensors, the one or more first sensors configured to detect the fifth-wheel hitch in a first position of the one or more positions of the fifth-wheel hitch;

generating, by the processor, a second metric corresponding to a second signal received from a drive assembly of the autonomous vehicle, the drive assembly configured to reposition the fifth-wheel hitch;

providing, by a user interface of the virtual driver system, feedback of an engagement status of the trailer with the fifth-wheel hitch while the virtual driver system is in the coupling mode, the feedback including at least one of a visual feedback, an aural feedback, or a haptic feedback; and applying one or more geofence restrictions to operation of the autonomous vehicle while in the coupling mode;

generating, by the processor and based on the first and second metrics, a third metric, the third metric corresponding to a second position of the one or more positions of the fifth-wheel hitch associated with a predetermined load balancing configuration of the autonomous vehicle;

transmitting, by the processor and responsive to a determination that the second position of the fifth-wheel hitch corresponds to the predetermined load balancing configuration of the autonomous vehicle, the third metric to the drive assembly for controlling the fifth-wheel hitch according to the third metric;

causing the virtual driver system of the autonomous vehicle to enter a coupled mode; and controlling operation of the autonomous vehicle in accordance with the predetermined load balancing configuration and the coupled mode by:

removing at least one of the one or more geofence restrictions applied during the coupling mode; and controlling the autonomous vehicle with the trailer coupled to travel along a trajectory.

2. The computer-implemented method of claim 1, the one or more first sensors comprising a sensor fixedly positioned at a first notch of the fifth-wheel hitch and configured to detect whether the fifth-wheel hitch is positioned at the first notch.

3. The computer-implemented method of claim 2, the first signal comprising a measurement of a capacitance between the one or more first sensors and the fifth-wheel hitch, wherein each of the one or more first sensors is fixedly positioned at corresponding notches of the fifth-wheel hitch.

4. The computer-implemented method of claim 3, the one or more first sensors comprising a sensor disposed at a second notch of the fifth-wheel hitch, the second notch sensor configured to detect whether the fifth-wheel hitch is positioned at the second notch.

5. The computer-implemented method of claim 4, wherein the second notch is disposed at the same side of the fifth-wheel hitch as the first notch and closer to a cab of the autonomous vehicle relative to the first notch of the fifth-wheel hitch.

6. The computer-implemented method of claim 4, further comprising:

causing, by the processor and based on the third metric, the drive assembly to reposition the fifth-wheel hitch of the autonomous vehicle to the second position corresponding to the predetermined load balancing configuration of the autonomous vehicle.

7. The computer-implemented method of claim 6 further comprising:

determining, by the processor and via at least the first notch sensor and the second notch sensor, that the fifth-wheel hitch has been repositioned to the second position, wherein the second position corresponds to the fifth-wheel hitch positioned at the second notch.

8. The computer-implemented method of claim 1, further comprising:

causing, by the processor and based on the third metric, a locking mechanism to engage and physically lock the fifth-wheel hitch in the second position.

9. The computer-implemented method of claim 8, further comprising:

causing, by the processor, the locking mechanism to disengage and physically release the fifth-wheel hitch to allow the drive assembly to further reposition the fifth-wheel hitch, wherein the coupled mode corresponds to the one or more first sensors indicating an engaged status, the engaged status reflecting an accessory being coupled to the fifth-wheel hitch.

10. The computer-implemented method of claim 1, the one or more first sensors comprising one or more magnetic sensors that are each fixedly positioned to a corresponding notch of the fifth-wheel hitch, the one or more magnetic sensors configured to detect the presence of one or more magnetic elements secured to the fifth-wheel hitch.

11. A system for controlling an autonomous vehicle comprising:

one or more first sensors;

one or more second sensors; and one or more processors, wherein the one or more processors are configured to:

operate, by a virtual driver system of the autonomous vehicle, the autonomous vehicle in a coupling mode to couple a fifth-wheel hitch of the autonomous vehicle with a trailer, the autonomous vehicle being a roadway vehicle, operate the autonomous vehicle in the coupling mode further comprising:

detect, via the one or more first sensors, one or more positions of a fifth-wheel hitch of the autonomous vehicle;

generate a first metric corresponding to a first signal received from the one or more first sensors configured to detect the fifth-wheel hitch in a first position of the one or more positions of the fifth-wheel hitch;

generate a second metric corresponding to a second signal received from a drive assembly of the autonomous vehicle, the drive assembly configured to reposition the fifth-wheel hitch;

provide, by a user interface of the virtual driver system, feedback of an engagement status of the trailer with the fifth-wheel hitch while the virtual driver system is in the coupling mode, the feedback including at least one of a visual feedback, an aural feedback, or a haptic feedback; and apply one or more geofence restrictions to operation of the autonomous vehicle while in the coupling mode;

generate, based on the first and second metrics, a third metric, the third metric corresponding to a second position of the one or more positions of the fifth-wheel hitch associated with a predetermined load balancing configuration of the autonomous vehicle;

transmit, in response to a determination that the second position of the fifth-wheel hitch corresponds to the predetermined load balancing configuration of the autonomous vehicle, the third metric to the drive assembly for controlling the fifth-wheel hitch according to the third metric;

cause the virtual driver system of the autonomous vehicle to enter a coupled mode; and control operation of the autonomous vehicle in accordance with the predetermined load balancing configuration and the coupled mode by:

removing at least one of the one or more geofence restrictions applied during the coupling mode; and controlling the autonomous vehicle with the trailer coupled to travel along a trajectory.

12. The system of claim 11, wherein the one or more first sensors comprise at least one sensor fixedly positioned at a first notch of the fifth-wheel hitch and configured to detect whether the fifth-wheel hitch is positioned at the first notch.

13. The system of claim 12, wherein the first signal comprises a measurement of a capacitance between the one or more first sensors and the fifth-wheel hitch, wherein each of the one or more first sensors is fixedly positioned at corresponding notches of the fifth-wheel hitch.

14. The system of claim 13, the one or more first sensors comprising a sensor disposed at a second notch of the fifth-wheel hitch to detect whether the fifth-wheel hitch is positioned at the second notch, wherein the second and first notches of the fifth-wheel hitch are disposed on the same side of the fifth-wheel hitch, and wherein the second notch is disposed closer to the front of the autonomous vehicle than the first notch.

15. The system of claim 14, the one or more processors further configured to:

cause, based on the third metric, the drive assembly to reposition the fifth-wheel hitch of the autonomous vehicle to the second position corresponding to the predetermined load balancing configuration of the autonomous vehicle.

16. The system of claim 15, the one or more processors further configured to:

determine, via the one or more first sensors and the one or more second sensors, that the fifth-wheel hitch has been repositioned to the second position, wherein the second position corresponds to the fifth-wheel hitch positioned at the second notch.

17. The system of claim 11, the one or more processors further configured to:

cause, based on the third metric and the determination that the fifth-wheel hitch is in the second position, a locking mechanism to engage and maintain the physical position of the fifth-wheel hitch during operation of the autonomous vehicle.

18. The system of claim 17, the one or more processors further configured to:

cause, based on a determination that the fifth-wheel hitch is not in the second position and the autonomous vehicle is deactivated, the locking mechanism to disengage and physically release the fifth-wheel hitch to allow the drive assembly to further reposition the fifth-wheel hitch, wherein the coupled mode corresponds to at least one of the one or more first sensors and the one or more second sensors indicating an engaged status, the engaged status reflecting an accessory being coupled to the fifth-wheel hitch.

19. The system of claim 11, wherein the one or more first sensors include one or more magnetic sensors and each magnetic sensor is fixedly positioned to each notch of the fifth-wheel hitch and configured to detect the presence of one or more magnetic elements fastened to the fifth-wheel hitch.

20. A non-transitory computer readable medium including one or more instructions stored thereon and executable by a processor of an autonomous vehicle, and that when executed by the processor of the autonomous vehicle, cause the processor to:

operate, by a virtual driver system of the autonomous vehicle, the autonomous vehicle in a coupling mode to couple a fifth-wheel hitch of the autonomous vehicle with a trailer, the autonomous vehicle being a roadway vehicle, operate the autonomous vehicle in the coupling mode further comprising:

detect, via one or more first sensors of the autonomous vehicle, one or more positions of a fifth-wheel hitch of the autonomous vehicle;

generate a first metric corresponding to a first signal received from the one or more first sensors, the one or more first sensors configured to detect the fifth-wheel hitch in a first position of the one or more positions of the fifth-wheel hitch;

generate a second metric corresponding to a second signal received from a drive assembly of the autonomous vehicle, the drive assembly configured to reposition the fifth-wheel hitch;

provide, by a user interface of the virtual driver system, feedback of an engagement status of the trailer with the fifth-wheel hitch while the virtual driver system is in the coupling mode, the feedback including at least one of a visual feedback, an aural feedback, or a haptic feedback; and apply one or more geofence restrictions to operation of the autonomous vehicle while in the coupling mode;

generate, based on the first and second metrics, a third metric, the third metric corresponding to a second position of the one or more positions of the fifth-wheel hitch associated with the predetermined load balancing configuration of the autonomous vehicle;

transmit, in response to a determination that the second position of the fifth-wheel hitch corresponds to the predetermined load balancing configuration of the autonomous vehicle, the third metric to the drive assembly for controlling the fifth-wheel hitch according to the third metric;

cause the virtual driver system of the autonomous vehicle to enter a coupled mode; and control operation of the autonomous vehicle in accordance with the predetermined load balancing configuration and the coupled mode by:

removing at least one of the one or more geofence restrictions applied during the coupling mode; and controlling the autonomous vehicle with the trailer coupled to travel along a trajectory.

* * * * *